CRYOGENIC SUPERCURRENT TUNNELING DEVICES

Filed Jan. 17, 1964

3 Sheets-Sheet 1

INVENTOR
J. M. ROWELL
BY
Sylvan Sherman
ATTORNEY

United States Patent Office 3,281,609

Patented Oct. 25, 1966

3,281,609

CRYOGENIC SUPERCURRENT TUNNELING DEVICES

John M. Rowell, Murray Hill, N.J., assignor to Bell Telephone Laboratories, Incorporated, New York, N.Y., a corporation of New York Filed Jan. 17, 1964, Ser. No. 338,467

10 Claims. (Cl. 307—88.5)

This invention relates to cryogenic switching and logic devices.

In a paper entitled "Possible New Effects in Superconductive Tunnelling," published in the July 1, 1962 issue of Physics Letters, pages 251 to 252, D. B. Josephson predicted theoretically that a supercurrent would flow between two superconductors separated by a thin insulating barrier, (i.e., a supercurrent tunnel junction). This effect has been observed and reported by P. W. Anderson and J. M. Rowell in a paper entitled "Probable Observation of the Josephson Superconducting Tunneling Effect," and published in the March 15, 1963 issue of Physical Review Letters, pages 230 to 232.

It is a characteristic of a superconducting tunnel junction that exhibits the Josephson effect, that the voltage across the junction remains zero over a range of supercurrents below a critical tunneling supercurrent. When the supercurrent flow through the junction exceeds the critical current, the voltage across the junction abruptly jumps to some higher finite value.

It has been further discovered by applicant that as the junction current flow is reduced from above the critical supercurrent, a tunneling supercurrent less than critical is reestablished through the junction and the junction voltage again drops to zero.

It is the object of this invention to utilize the so-called "Josephson effect" and applicant's discovery to produce cryogenic switching and logic devices.

In accordance with one embodiment of the invention, a superconducting tunnel junction, comprising a pair of superconductors separated by a thin insulating layer, is energized by means of a pair of current sources. With the current from each source slightly less than the critical supercurrent, the voltage across the junction is zero as long as both sources are not simultaneously applied. When currents from both current sources are simultaneously applied to the superconductors, however, the critical supercurrent is exceeded and the voltage across the junction abruptly increases to some finite value.

Various alternate embodiments and arrangements are disclosed in which a magnetic field is applied to the insulating layer in order to vary the critical supercurrent.

In general, superconducting tunnel junctions exhibiting the Josephson effect can be used as cryogenic switches or to perform logic functions.

Figure 1:
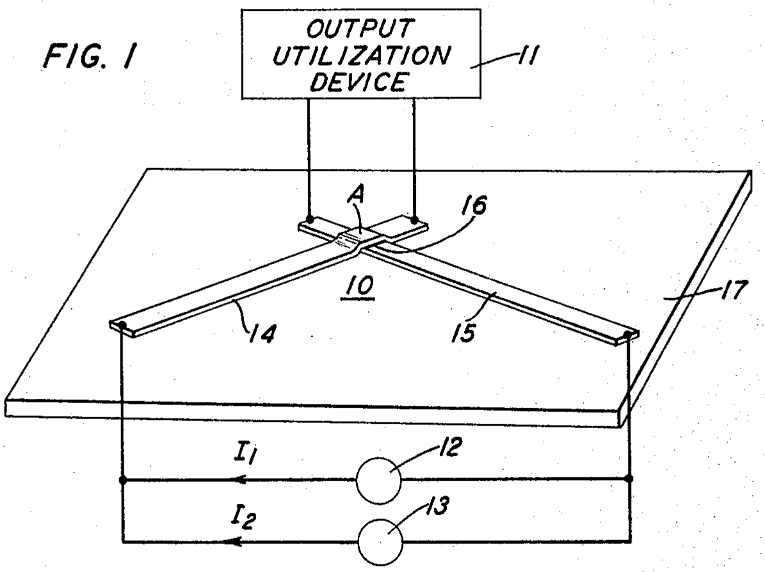
Figure 2:
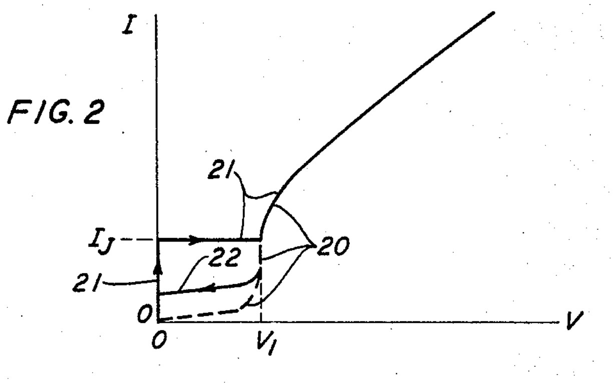
Figure 3:
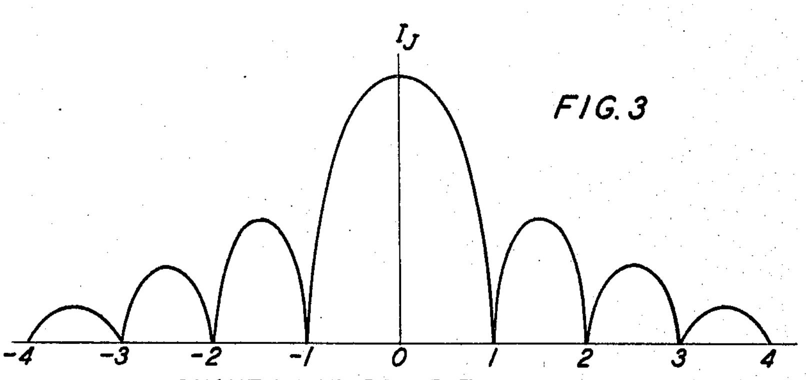
Figure 4:
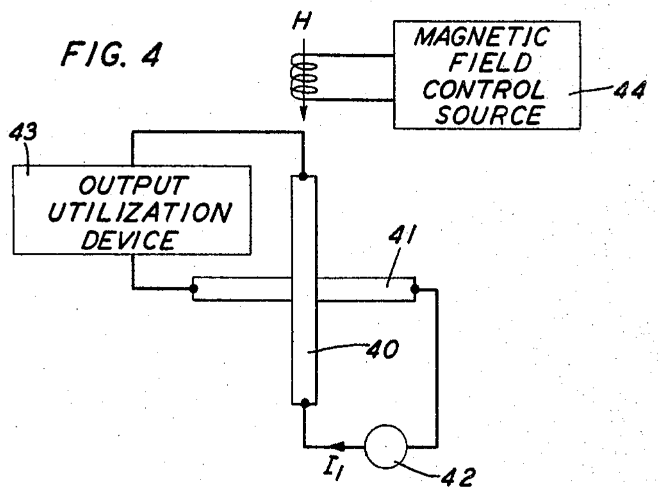
Figure 5:
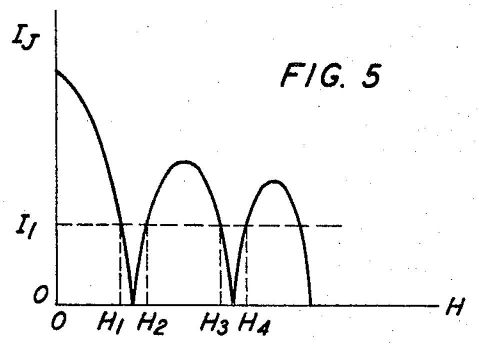
Figure 6:
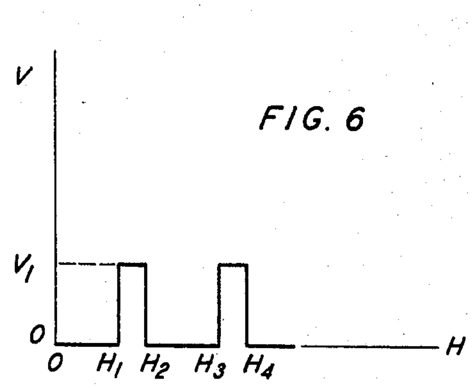
Figure 7:
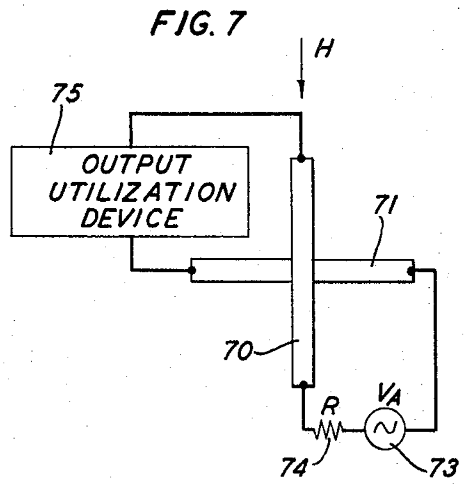
Figure 8:
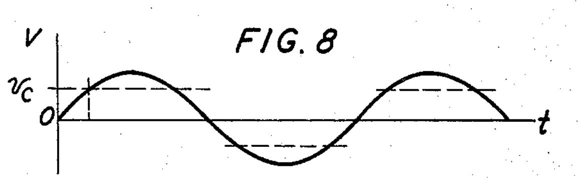
Figure 9:
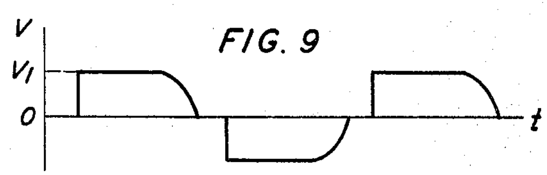
Figure 10:
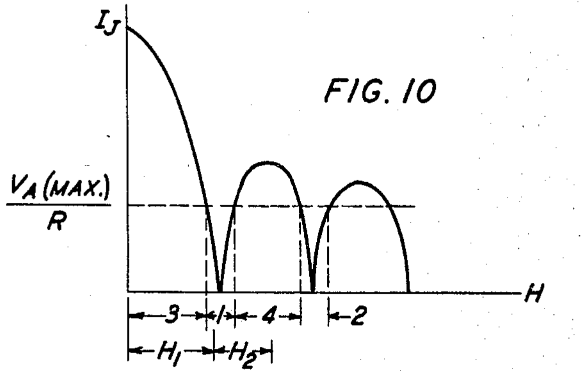
Figure 11:
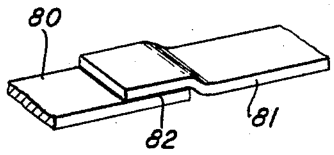

These and other objects and advantages, the nature of the present invention, and its various features, will appear more fully upon consideration of the various illustrative embodiments now to be described in detail in connection with the accompanying drawings, in which:

FIG. 1 is a first embodiment of the invention utilizing two current sources;

FIG. 2, given for purposes of explanation, is the current-voltage characteristic of a superconducting tunnel junction exhibiting the Josephson effect;

FIG. 3, given for purposes of explanation, illustrates the variation of the critical supercurrent as a function of magnetic field;

FIG. 4 is a second illustrative embodiment of the invention utilizing a magnetic field to vary the critical supercurrent;

FIGS. 5 and 6, given for purposes of explanation, explain the mode of operation of the embodiment of FIG. 4;

FIG. 7 is a further embodiment of the invention utilizing an alternating current source and a magnetic field;

FIGS. 8 and 9 explain the mode of operation of the embodiment of FIG. 7;

FIG. 10 explains the mode of operation of the embodiment of FIG. 7 utilizing two magnetic fields; and FIG. 11 shows an alternate construction of a supercurrent tunnel junction.

Referring to FIG. 1, there is shown a first embodiment of the invention comprising a superconducting tunnel junction 10, an output utilization device 11, and current sources 12 and 13.

In this illustrative embodiment, the superconducting tunnel junction 10 comprises two insulated superconductors 14 and 15, oriented to cross each other at a region A along their respective lengths. The superconductors are separated at region A by means of an insulating layer 16 located between them.

Typically the device is fabricated by depositing the superconductors in sequence, as strips, upon a dielectric substrate 17. The technique and processes employed for doing so are well known. The surface of the first deposited superconducting strip is oxidized before the second strip is deposited, thus providing the necessary insulation between the strips in the region A where they cross. For producing large Josephson currents, insulating layers of the order of 10 to 15 A. thick are typical. A suitable junction for the purposes of practicing the present invention is a lead-insulator-lead (P*b*–I–P*b*) junction in which the insulator is lead oxide. Strip widths of about 0.2 mm. are usual. As the transition temperature for lead is 7.30 K., the Josephson effect is readily observed at 4.20 K., the temperature of liquid helium.

Curve 20 of FIG. 2 is the usual current-voltage characteristic of a superconducting tunnel junction. As illustrated, the voltage increases with current until a voltage $V_1$ of from 2.8 to 4 millivolts, (depending upon the materials used), is reached at which point there is a sharp rise in current with little change in voltage. At higher current levels, the I–V characteristic is that of the tunnel junction when both metal films are normal (not superconducting).

As the thickness of the insulating layer is reduced however, an additional current flows through the junction. This flow of supercurrent (the D.C. Josephson effect) produces no resultant voltage across the junction. The effect upon the current-voltage characteristic is shown by curve 21 of FIG. 2, wherein an initial current increase from zero produces no corresponding increase in junction voltage. The junction can carry only a limited supercurrent $I_J$, however, and above this critical current, switches abruptly to the usual current-voltage characteristic with a corresponding increase in voltage across the junction to $V_1$.

The transition from $V_1$ to zero voltage for decreasing current occurs at a current that is somewhat less than $I_J$, producing a hysteresis effect. This is illustrated by curve portion 22 in FIG. 2.

Referring again to FIG. 1, current sources 12 and 13, when energized, supply currents $I_1$ and $I_2$, respectively, of like polarity. For one mode of operation, both $I_1$ and $I_2$ are each less than critical supercurrent. Thus, when only one source is activated, the voltage between superconductors 14 and 15 is zero. However, when both current sources are activated, the total supercurrent, $I_1+I_2$, exceeds the critical current, causing an abrupt increase in the voltage across the junction. This change in voltage from zero to $V_1$ is applied to the output utilization device 11. Accordingly, the embodiment of FIG. 1 performs the logic "AND" function by producing an output in response to the simultaneous application of currents from sources 12 and 13.

If, on the other hand, the current from each of the sources 12 and 13 is designed to exceed the critical supercurrent $I_J$, then the voltage across the junction will increase to $V_1$ (or greater) upon the application of currents from either source and will remain at $V_1$ until both currents are removed. Thus, with $I_1$ and $I_2$ each greater than $I_J$, the device performs the logic "OR" function. By utilizing current sources of opposite polarities, various other logic functions can be achieved.

In my paper entitled "Magnetic Field Dependence of the Josephson Tunnel Current" published in the September 1, 1963 issue of the Physical Review Letters, the effect of a magnetic field upon the critical supercurrent, $I_J$, is described. FIG. 3 is illustrative of the described effect. At zero magnetic field, the critical supercurrent is a maximum. Minima occur when the field at the junction contains an integral number of quantum units of flux, where a quantum unit is given by $hc/2e$ equal to equal to $2.1\times10^{-7}$ gauss cm.$^2$, where $h$ is Planck's constant, $c$ is the velocity of light, and $e$ is the electron charge.

The I–V and the $I_J$–H characteristics of FIGS. 2 and 3 make possible additional cryogenic devices of which the following few are illustrative.

In FIG. 4 there is illustrated a superconducting tunnel junction comprising the crossed superconductors 40 and 41. A current source 42 is connected between one end of the superconductors and an output utilization device 43 is connected between their other ends as shown.

In place of a second current source, as in FIG. 1, a magnetic field is applied to the junction. The intensity of the field is controlled by means of a magnetic field control source 44.

The operation of the device shown in FIG. 4 is best explained by reference to FIGS. 5 and 6. FIG. 5 shows the variation of critical supercurrent as a function of magnetic field. With a supercurrent $I_1$ applied from source 42, the junction current is less than critical for magnetic fields between zero and $H_1$. Between $H_1$ and $H_2$, current $I_1$ exceeds the critical supercurrent. Between $H_2$ and $H_3$, $I_1$ is again less than critical whereas it exceeds the critical supercurrent between $H_3$ and $H_4$.

FIG. 6 shows the variations in junction voltage as a function of magnetic field. Recalling that between zero field and $H_1$, the current $I_1$ is less than critical, the junction voltage is correspondingly zero. Between $H_1$ and $H_2$, however, the current $I_1$ is greater than critical, and the junction voltage changes to $V_1$. Between $H_2$ and $H_3$, the voltage is again zero, and between $H_3$ and $H_4$ it again rises to $V_1$. Thus, by selecting the current $I_1$ and by varying the magnetic field, the transition points can be changed and pulses of different widths can be generated.

In FIG. 7 there is an additional embodiment of the invention in which an alternating current is applied to the superconductors 70 and 71. The alternating current is derived from an alternating current voltage source 73 and applied to the superconductors through a resistance 74 of amplitude R which is preferably about ten times the junction resistance when biased well above the critical current.

The voltage $V_A$ from source 73 is limited such that at zero magnetic field ($H=O$), $V_A/R_{(\max)}$ is less than critical supercurrent. Under this condition, the output voltage applied to the output utilization device 75 is zero. If, however, a magnetic field is applied to the junction such that the critical supercurrent is reduced to a value less than $V_A/R_{(\max)}$ the unit will switch to the high voltage state whenever the instantaneous current from voltage source 73 exceeds the critical current. The various input and output voltages for the situations described above are shown in FIGS. 8 and 9.

FIG. 8 shows the instantaneous voltage $V_A$ applied to the series-connected junction resistor. In the presence of a magnetic field, the instantaneous current exceeds the critical supercurrent when $V_A$ exceeds $v_c$ where $v_c/R$ is the critical current for the particular magnetic field, and the junction voltage changes from zero to $V_1$ as indicated in FIG. 9. The junction voltage remains at $V_1$ until the instantaneous voltage reaches some value less than $v_c$ (due to the slight hysteresis effort described above) at which time the junction voltage drops again to zero. This process repeats itself every half cycle of $V_A$.

It is readily apparent that the junction voltage can be controlled by controlling the magnitude of the magnetic field applied to the junction. If the field applied to the junction is derived from two different sources $H_1$ and $H_2$, the output voltage obtained across the junction can be made to vary as a function of these two fields. For example, FIG. 10 shows the manner in which the critical supercurrent varies as a function of magnetic field. If the maximum current that can be caused to flow is $V_A/R_{(\max)}$, an output voltage of the type shown in FIG. 9 will be produced by a field $H_1$ whose amplitude lies within the region (1) shown in FIG. 10. If there is a second field $H_2$ whose amplitude is approximately $H_2=\frac{1}{2}H_1$, it is apparent from FIG. 10 that in the presence of both fields $H_1$ and $H_2$, the current through the junction will never exceed the critical current and there will be no output voltage variations. A tabulation of the output voltage as a function of applied magnetic field is, therefore, as follows:

$H_2$ alone—no output
$H_1$ alone—output
$H_1+H_2$—no output
$H_1-H_2$—no output.

In another mode of operation, the tunnel junction current is swept continuously from zero in the presence of a magnetic field H. If the amplitude of H is made equal to $(n+\frac{1}{2})H_1$, the current level (or time) at which the device switches from "no output" to "output" is a measure of the integer $n$. The device, therefore, acts as a counter or digital sensor.

In the various embodiments described herein, the superconducting junction has been illustrated as comprising two crossed superconductors. Alternative arrangements can be made, however, as illustrated in FIG. 11, wherein the junction comprises two slightly overlapping superconductors 80 and 81 separated by means of an insulating layer 82. Thus, it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A supercurrent tunnel junction device comprising a pair of superconductors separated by means of an insulating layer that is sufficiently thin to permit supercurrent tunneling therethrough, said junction having a hysteretic current-voltage characteristic including a region of increasing current at zero voltage and a critical tunneling supercurrent at which the junction voltage abruptly increases from said zero voltage to some finite higher value, and including a region of decreasing current less than said critical current at which said junction voltage abruptly decreases from substantially said finite value to zero voltage, first and second current sources for applying current to said junction whose amplitude varies from greater than said critical current to less than said current at which said voltage switches from substantially said finite value to zero, and an output circuit connected across said junction.

2. The device according to claim 1 wherein each of said current sources is adapted to deliver a current that is less than said critical current.

3. The device according to claim 1 wherein each of said current sources is adapted to deliver a current that is greater than said critical current.

4. The device according to claim 1 wherein said superconductors comprise a pair of crossed members.

5. The device according to claim 1 wherein said superconductors comprise a pair of overlapping members.

6. A supercurrent tunnel junction device comprising:
a pair of superconductors separated by means of an insulating region that is sufficiently thin to permit supercurrent tunneling therethrough,
said junction having a current-voltage characteristic including a region of increasing current at zero junction voltage and a critical tunneling supercurrent at which the junction voltage abruptly increases from said zero voltage to some finite higher value,
said junction further characterized in that said critical current varies as a function of magnetic field,
a source of direct current connected between said superconductors, for producing a given current flow across said junction,
means for applying a variable magnetic field to said junction to vary the amplitude of said critical current between values greater than and less than said given current,
and output means connected across said junction.

7. The device according to claim 6 wherein the current from said current source is less than the critical current from said junction at zero magnetic field.

8. A supercurrent tunnel junction device comprising:
a pair of superconductors separated by means of an insulating layer that is sufficiently thin to permit supercurrent tunneling therethrough, said junction having a current-voltage characteristic including a region of increasing current at zero junction voltage and a critical tunneling supercurrent at which the junction voltage abruptly increases from said zero voltage to some finite higher value,
said junction further characterized in that said critical current varies as a function of magnetic field,
means for applying a magnetic field to said junction,
means comprising an alternating current source connected between said superconductors for producing a tunneling current whose amplitude alternately varies between values greater than and values less than said critical supercurrent,
and output means connected across said junction.

9. The device according to claim 8 wherein the maximum instantaneous current from said current source is less than the zero magnetic field critical current.

10. The device according to claim 8 including means for varying said magnetic field.

References Cited by the Examiner

UNITED STATES PATENTS

| | | | |
|---|---|---|---|
| 3,093,754 | 6/1963 | Mann | 317—234 |
| 3,116,427 | 12/1963 | Giaever | 317—235 |
| 3,193,685 | 7/1965 | Burstein | 317—234 |
| 3,209,160 | 9/1965 | Jeeves | 307—88.5 |

FOREIGN PATENTS

| | | |
|---|---|---|
| 1,060,881 | 7/1959 | Germany. |

JOHN W. HUCKERT, *Primary Examiner.*

J. D. CRAIG, *Assistant Examiner.*